United States Patent [19]
Goto et al.

[11] Patent Number: 5,581,671
[45] Date of Patent: Dec. 3, 1996

[54] METHOD AND APPARATUS FOR MOVING-PICTURE DISPLAY OF THREE-DIMENSIONAL IMAGES

[75] Inventors: Yoshihiro Goto, Tokyo; Kazuhiro Sato, Ibaraki-ken, both of Japan

[73] Assignee: Hitachi Medical Corporation, Tokyo, Japan

[21] Appl. No.: 322,553

[22] Filed: Oct. 13, 1994

[30] Foreign Application Priority Data

Oct. 18, 1993 [JP] Japan .................................. 5-259581

[51] Int. Cl.$^6$ ....................................... G06T 17/50
[52] U.S. Cl. ............................................ 395/119
[58] Field of Search ........................... 395/119, 127, 395/137, 138, 139; 382/128, 131, 132

[56] References Cited

U.S. PATENT DOCUMENTS 4,975,973  12/1990  Kasano et al. .......................... 382/168

OTHER PUBLICATIONS

Hogan et al., "Micro Computed Tomography: Removal of Translational Stage Backlash", IEEE, vol. 40, No. 4, pp. 1238–1241, Aug. 1993.

Robb et al., "Analyze: A Software System for Biomedical Image Analysis", IEEE, pp. 507–518, 1990.

Authorware Professional, User's Guide, 1992, pp. 238–241.

Robb et al. "Interactive display and Analysis of 3–D Medical Images", IEEE Transactions on Medical Imaging, vol. 8, No. 3, pp. 217–226, Sep. 1989.

Dickmanns, "Dynamic Scene Analysis and Applications", Plenary Talk, Sixth MDSP Workshop, pp. 95–96.

Drebin et al., "Volumetric Rendering of Computed Tomography Data: Principles and Techniques", pp. 24–32.

Primary Examiner—Heather R. Herndon
Assistant Examiner—Cliff N. Vo
Attorney, Agent, or Firm—Antonelli, Terry, Stout & Kraus

[57] ABSTRACT

A moving-picture display method in which a stacked region of a plurality of planar images is changed, a three-dimensional image is constructed corresponding to each changed stacked region, projected three-dimensional images on a desirably set viewing plane are determined from the constructed three-dimensional images, and obtained projected three-dimensional images are sequentially displayed in order of stacked regions which sequentially increase or decrease in size.

15 Claims, 10 Drawing Sheets

FIG. 2

| PROJECTED THREE-DIMENSIONAL IMAGE | NUMBER OF STACKED SHEETS | STACKING NUMBER |
|---|---|---|
| $D_1$ | 2 | #1, #2 |
| $D_2$ | 3 | #1, #2, #3 |
| $D_3$ | 4 | #1 ~ #4 |
| ⋮ | ⋮ | ⋮ |
| $D_{n-1}$ | n | #1   #n |

METHOD AND APPARATUS FOR MOVING-PICTURE DISPLAY OF THREE-DIMENSIONAL IMAGES

BACKGROUND OF THE INVENTION

The present invention relates to a method and apparatus for moving-picture display of three-dimensional images constructed by stacking planar images such as CT images and, more particularly, to a method and apparatus for moving-picture display of three-dimensional images which can display an image similar to that obtained when a region of interest is observed while moving an endoscope.

A three-dimensional display apparatus has been well known in which planar images such as CT images are stacked to construct a three-dimensional image, wherein the three-dimensional image is projected on a viewing plane (projecting plane) and a projected three-dimensional image is displayed. Projection is carried out in various ways including a depth method, a surface method and a method using the depth and surface methods in combination. They are disclosed in JP-A-62-219076, JP-A-62204387 and JP-A-62-169280.

Displaying a projected three-dimensional image permits recognition of an external construction of a cubic object to be examined, contributing to diagnosis and treatment.

The object to be examined has internal organs having an inner cavity such as an intestine and a stomach. For observation of the inner cavity, an endoscope using, for example, a fiberscope is inserted and moved inside the inner cavity to observe, for example, the inner wall of the cavity.

Then, upon display of a projected three-dimensional image, if observation similar to that seen through an endoscope can be permitted on the display screen, this will greatly contribute to image observation and diagnosis as well as various kinds of medical treatments.

SUMMARY OF THE INVENTION

An object of the present invention is to provide a method and apparatus for moving-picture display of three-dimensional images which can perform observation similar to that seen through an endoscope when displaying projected three-dimensional images.

According to the invention, in a moving-picture display apparatus for moving-picture display of three-dimensional images constructed by stacking a plurality of planar images, a stacked region is decreased or increased, a stacked three-dimensional image obtained each time that the stacked region is decreased or increased is stored in a memory, and three-dimensional images are read out sequentially in accordance with stacking order of stacked regions and displayed as a moving picture on a display screen.

Further, according to the present invention, in a moving-picture display apparatus in which three-dimensional images are constructed by stacking a plurality of planar images, projected three-dimensional images are constructed from the three-dimensional images on a desirably set viewing plane and the projected three-dimensional images are displayed as a moving picture, a stacked region is renewed sequentially, a three-dimensional image projected on the viewing plane is determined from a stacked three-dimensional image of a stacked region upon each update and stored in a memory, advance moving-picture designation or retreat moving-picture designation for determining the display mode of a moving picture is inputted by a designation input unit, the projected three-dimensional images are read out sequentially in order of ones corresponding to stacked regions which begins with a larger stacked region when the advance moving-picture designation is inputted but in order of ones corresponding to stacked regions which begins with a smaller stacked region when the retreat moving-picture designation is inputted, and the read-out projected three-dimensional images are displayed as a moving picture on a display screen.

Further, according to the present invention, when inputting the advance or retreat moving-picture designation, a desirably chosen stacked region is set as a reference region, projected three-dimensional images are read out sequentially in order of ones corresponding to stacked regions which sequentially increase beginning with the stacked region set as the reference and displayed when the advance moving-picture designation is inputted but in order of ones corresponding to stacked regions which sequentially decrease beginning with the stacked region set as the reference and displayed when the retreat moving-picture designation is inputted.

Further, according to the present invention, projected three-dimensional images determined corresponding to respective stacked regions are prepared in order of stacked regions which decrease sequentially beginning with a larger stacked region and projected three-dimensional images are displayed as a moving picture on the display screen each time that the projected three-dimensional image is prepared when the advance moving-picture designation is inputted but in order of stacked regions which increase sequentially beginning with a smaller stacked region and projected three-dimensional images are displayed as a moving picture on the display screen each time that the projected three-dimensional image is prepared when the retreat moving-picture designation is inputted.

Further, according to the present invention, the prepared projected three-dimensional images are displayed in such a manner that the center of a region of interest as set is always brought to the same position on the display screen.

Further, according to the present invention, images for which the center is brought to the same position on the display screen are applied with an enlarging processing and displayed as a moving picture.

According to the present invention, the stacked region is sequentially updated, a three-dimensional image obtained corresponding to each stacked region or a projected three-dimensional image constructed from the three-dimensional image is stored in a memory in advance or a projected three-dimensional image is prepared on real time base, and projected three-dimensional images are displayed as an advance or retreat moving picture to provide an image display similar to that observed through an endoscope.

Further, according to the present invention, by moving the center of a region of interest to a designated position (fixed position) on the display screen, the region of interest, even when it has a sinuous tubular construct, can be observed along the tube inner wall.

BRIEF DESCRIPTION OF THE DRAWINGS

FIG. 2 shows how a projected three-dimensional image is related to the number of stacking slices and the stacking number in the present invention.

DESCRIPTION OF THE PREFERRED EMBODIMENTS

Figure 1:
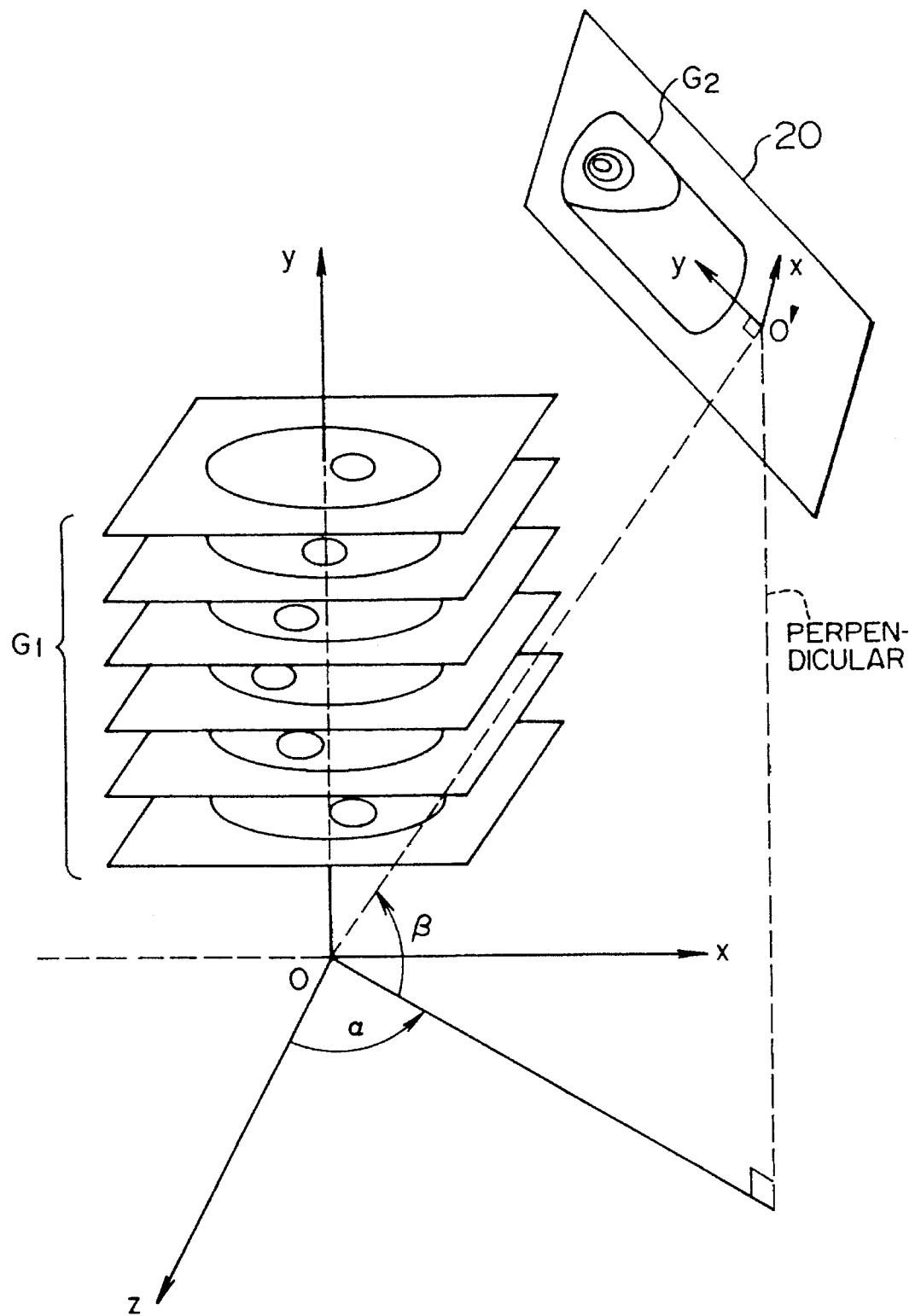
FIG. 1 is a diagram showing the relation between CT images and a display screen in the present invention.

FIG. 1 is a diagram showing the relation between CT images and a display screen in the present invention. In FIG. 1, a stacked three-dimensional image G1 is illustrated which is obtained when a plurality of CT images are stacked. In this example, stacking of 6 slices is exemplified. By increasing the number of slices and decreasing the stacking pitch, a stacked three-dimensional image which is more precise than the illustrated one can be obtained. A viewing plane 20 corresponding to a CRT display screen is set at a desired position in relation to the stacked three-dimensional image G1, and the stacked three-dimensional image is projected on the viewing plane 20 to provide a display as represented by G2. This projected image G2 is a projected three-dimensional image (in essence, a two-dimensional image).

For the sake of obtaining a projected three-dimensional image, coordinate systems are needed. For example, systems of coordinates as below are considered. More particularly, in FIG. 1, a three-dimensional Cartesian coordinate system (x,y,z) is set up for the stacked three-dimensional image and a coordinate system (X,Y) is set up on the viewing plane. When the viewing plane 20 is viewed from the coordinate system (x,y,z), it can be defined by direction angles β and α. The direction angle β is an angle subtended by a straight line, connecting origin o of the three-dimensional coordinate system to origin o' of the coordinate system (X,Y), and the x-z plane. The direction angle α is an angle subtended by a straight line, connecting an intersection at which a perpendicular extending downwards from the origin o' of the coordinate system (X,Y) toward the x-z plane intersects the x-z plane to the origin o of the three-dimensional coordinate system, and the z axis. In other words, β indicates a height of the display screen and α indicates a rotational position from the z axis on the x-z plane.

A depth method and a surface method are available as a method of obtaining a projected three-dimensional image.

The depth method is a display method in which the distance between a CT image and the viewing plane is considered and the shorter the distance, the brighter the display is rendered and the longer the distance, the darker the display is rendered.

Details are described in SPIE Vol. 626 Medicine XIV/PACS IV (1986).

The surface method is a display method in which a projected three-dimensional image is constructed by the depth method and is displayed in white when the absolute value of a difference between adjacent pixel values is zero but the greater the absolute value, the darker the display is rendered.

Details are described in U.S. Pat. No. 4,866,612.

A method using the above two methods in combination is also available. Relevant to the projected three-dimensional image are JP-A-62-204387, JP-A-62219076 and JP-A-62-169280 but the present embodiment is not limited thereto. A method called a volume rendering method may also be employed.

In the volume rendering method, incoming light from the viewing plane is assumed and a reflection factor and a transmission factor are set desirably in accordance with a CT value to obtain a quantity of light incident on the viewing plane in the construction of the product of a quantity of reflection light from each voxel and a gradient across equi-height planes of CT values. Accordingly, the quantity of reflection light incident on the viewing plane becomes zero at a site where the gradient across equi-height planes of CT values is zero and a tissue corresponding to a portion where the gradient across CT values is zero is deemed as a cavity and displayed in black like air.

Details of the volume rendering method is described in Computer Graphics, Vol. 22, No. 4, Aug. 1988, pp. 65–74.

Embodiment 1

Figure 3:
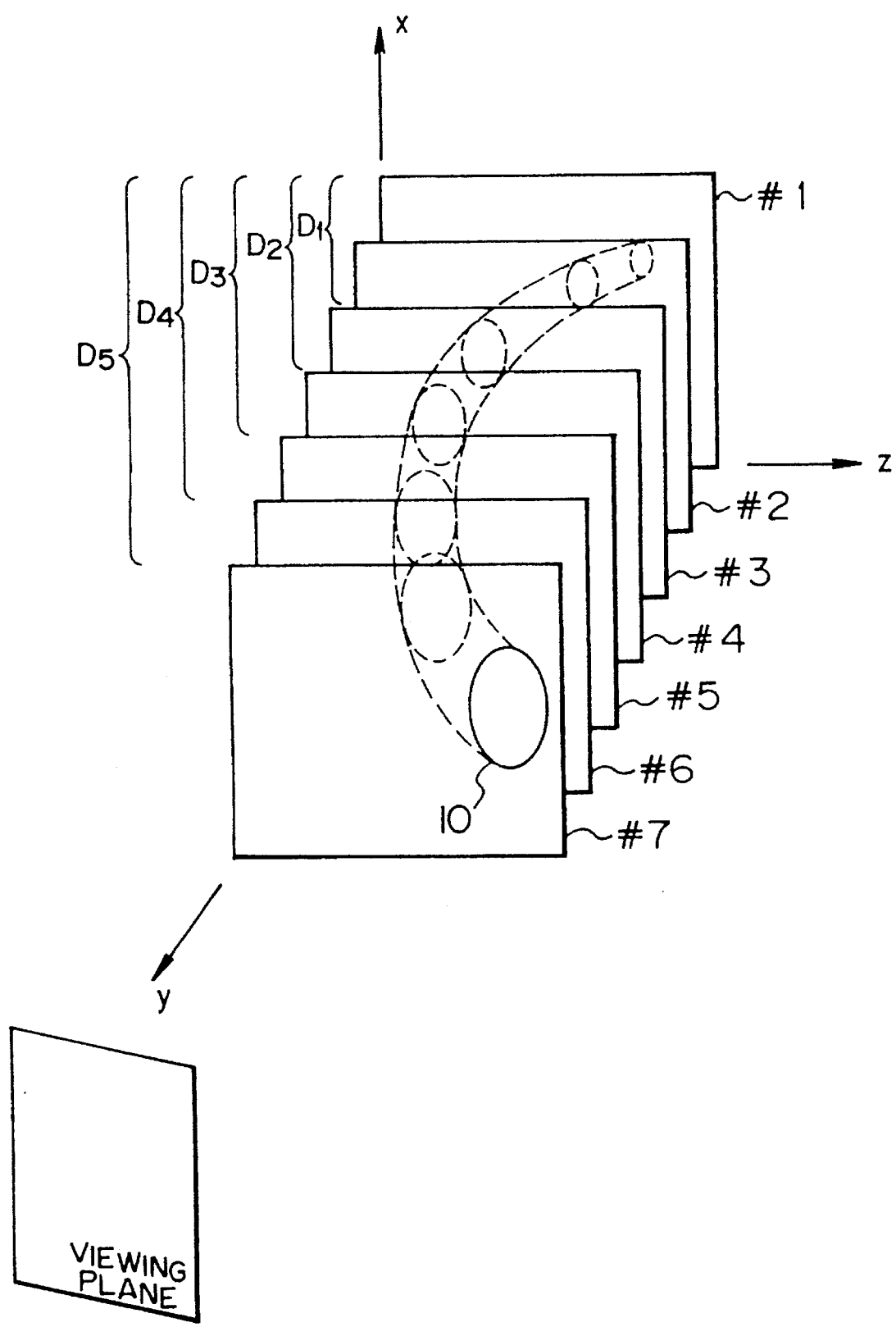
FIG. 3 is a diagram for explaining preparation of projected three-dimensional images for β=90° in the present invention.

In this embodiment, β=90° is assumed. Given that β=90°, an instance is shown where the viewing plane 20 in FIG. 1 is set up in parallel with slice CT images. Namely, in this example, the viewing plane 20 is present in the y-axis direction. In the present embodiment, a stacked region has a size which is determined by designating the number of slices of CT images and increasing or decreasing the stacked region means re-designation of the number of CT image slices. In the present embodiment, the relation between a projected three-dimensional image and the number of stacked slices is shown in FIG. 2. Starting from a slice close to the origin o of the coordinate system (x,y,z), n slices of CT images are assigned with #1, #2, ..., #n. Two lower-count slices of CT images #1 and #2 are stacked to construct a projected three-dimensional image D1. Then, the number of slices is increased one by one to construct a projected three-dimensional image D2 of three slices, a projected three-dimensional image D3 of four slices, ..., and a projected three-dimensional image $D_{n-1}$ of n slices. These projected three-dimensional images D1, D2, ..., $D_{n-1}$ are stored in a memory. FIG. 3 shows how projected images D1, D2, ... are constructed on the basis of tomographic images 1#, #2 ... of an intestine 10 of a human internal organ.

Figure 4A:
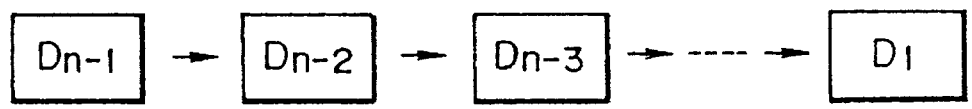
FIGS. 4A and 4B are diagrams showing an embodiment of moving conditions of a moving picture according to the present invention.
Figure 4B:
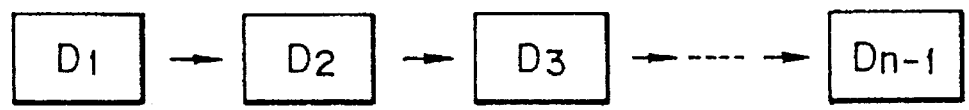

In the present embodiment, the projected three-dimensional images D1 to $D_{n-1}$ stored in the memory are read out sequentially to display a moving picture. Specific examples of moving-picture display are shown in FIGS. 4A and 4B. The function of advance moving-picture designation and the function of retreat or reverse moving-picture designation are incorporated in an input unit such as a keyboard and any one of the functions is accomplished by turning on a corresponding key switch. When an advance moving picture is designated, the display sequence of moving picture as shown in FIG. 4A is undertaken to sequentially read out the projected three-dimensional images from the memory in order of ones corresponding to stacked sheet numbers which sequentially decrease beginning with a larger sheet number and display read-out images. When a retreat or reverse moving picture is designated, the display sequence of moving picture as shown in FIG. 4B is undertaken, so that conversely to FIG. 4A, the projected three-dimensional images are sequentially read out of the memory in order of ones corresponding to stacked slice numbers which sequentially increase beginning with a smaller slice number and are displayed.

Through the operations as above, since the distance from the viewing plane increases in the case of the advance moving-picture designation of FIG. 4A, the images are displayed as if a cavity interior was viewed with an endoscope advancing in the cavity. Since the distance from the viewing plane decreases in the case of the retreat moving-picture designation of FIG. 4B, the images are displayed as if the cavity interior was viewed with the endoscope retreating in the cavity. Thus, a feeling of observation using the endoscope can be viewed on the screen. Further, this can afford to improve the ability to diagnose the inside of the cavity through images. It will easily be understood that in the moving-picture display, even for a sinuous portion such as the intestine 10 in FIG. 3, the condition of sinuosity and the condition of the inside of the intestine can be observed.

Figure 5A:
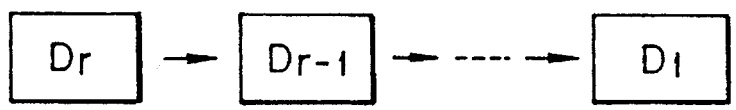
FIGS. 5A and 5B are diagrams showing another embodiment of moving conditions of a moving picture according to the present invention.
Figure 5B:
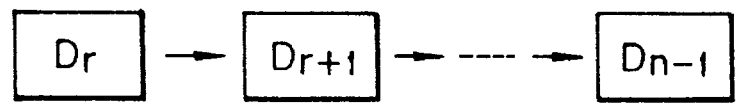

In FIGS. 4A and 4B, all of the images D1 to $D_{n-1}$ or $D_{n-1}$ to D1 must be read out. However, by defining a projected three-dimensional image serving as a reference and performing an advance or retreat moving-picture display relative to the reference, the number of image reading out operations can be reduced. These embodiments are shown in FIGS. 5A and 5B. FIG. 5A illustrates advance and FIG. 5B retreat. In the case of FIG. 5A, reading out of images $D_{n-1}$ to $D_{r=1}$ can be unnecessary and in the case of FIG. 5B, reading out of images D1 to $D_{r-1}$ can be unnecessary. The reference projected three-dimensional image can be established at the discretion of the operator and may be set up in accordance with a portion to be diagnosed while viewing the screen. In an alternative, the embodiments of FIGS. 5A and 5B may be used in combination with the embodiments of FIGS. 4A and 4B. More particularly, a moving-picture display is performed in connection with D1 to $D_{n-1}$ or $D_{n-1}$ to D1 in accordance with FIGS. 4A and 4B and thereafter a portion of interest is found and a reference projected three-dimensional image is set at the portion or before or behind that portion.

Embodiment 2

In this embodiment, $\beta \neq 90°$ is assumed.

In the foregoing, the instance has been described in which the viewing plane is on the y axis and is so simplified that the size of a stacked region is determined by the distance from the viewing plane to a slice number. Accordingly, the distance corresponds to a slice number and hence by designating a slice number, the stacked region can be increased or decreased to provide projected three-dimensional images D1, D2, ... Dn.

Figure 6:
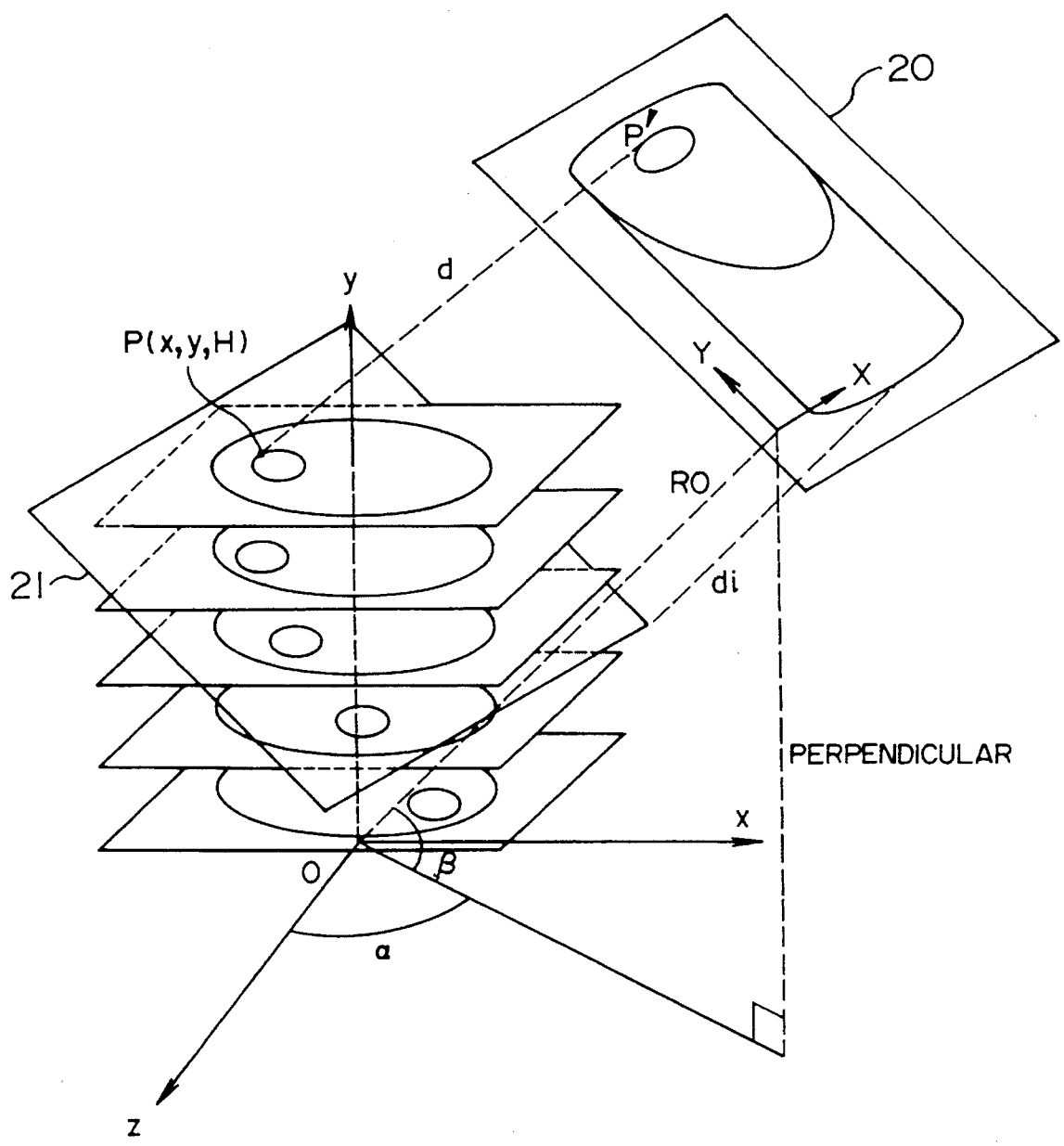
FIG. 6 is a diagram showing a modified embodiment of a stacked region for β≠90° according to the present invention.

Generally, however, the viewing plane is positioned as shown in FIG. 6, that is, an instance where $\beta \neq 90°$ is used frequently. In this case, projected three-dimensional images D1 to Dn to be constructed corresponding to different stacked regions cannot be distinguished from each other by using the slice number. Therefore, a distance d between a pixel position of a three dimensional image and a pixel position of a projected three-dimensional image corresponding to the viewing plane is considered and distances d and di which is shown afterward are compared with each other in magnitude to obtain a stacked three-dimensional image. The distance d is expressed by equation 1 as below. The pixel position of the projected three-dimensional image on the viewing plane is a position at which a straight line assumed to extend from the pixel position of the stacked three-dimensional image is incident on the viewing plane at right angle. Accordingly, the distance d is defined by a distance between the pixel position P of the stacked three-dimensional image and the orthogonally incident position P' of the assumed straight line on the viewing plane.

Equation 1 is given by $$d = |(\cos \beta \cdot \sin \alpha) \cdot x + (\cos \beta \cdot \cos \alpha) \cdot z + (\sin \beta) \cdot H - Ro|$$

where a coordinate system of the pixel position P of stacked three-dimensional image at a slice plane of y=H is represented by (x,z,H) and the distance between the origin o of coordinate system (x,z,y) and the viewing plane is represented by Ro. Here, H represents a value of y coordinates and can automatically be determined definitely by designating the stacking number of a stacked CT image (the stacking number starts from a position close to the origin to count 1, 2, ...).

In FIG. 6, a plane 21 parallel to a viewing plane 20 is assumed and the plane 21 is considered to be a cutting plane, that is, the uppermost plane of stacked region. Images which are behind the cutting plane 21 as viewed from the viewing plane 20 are stacked to obtain a stacked three-dimensional image. Images before the cutting plane 21, that is, images close to the viewing plane 20 are neglected. The cutting plane is changed by changing the distance between cutting plane 21 and viewing plane 20 to d1, d2, d3, ... (d1>d2>d3>...) and each time that the distance is changed, the method for constructing a three-dimensional image, such as the depth method, surface method, volume rendering method or others which can construct the three-dimensional image, is applied to an image region constructed of stacked images which are behind each set distance and then projected three-dimensional images D1, D2, D3, ... are constructed. The distances dl, d2, ..., di, ... corresponding to the cutting planes are called threshold distances. In order to stack images behind distance di, a processing may be carried out in which the distance di is compared with the distance d of each pixel determined by equation 1 and only pixels meeting d≧di are chosen to be stacked but pixels meeting d<di are not chosen to be stacked. In another embodiment, the cutting plane 21 may not be parallel to the viewing plane. In still another embodiment, a projected three-dimensional image may be obtained from images which are not behind the cutting plane but before the cutting plane.

Embodiment 3

Figure 7:
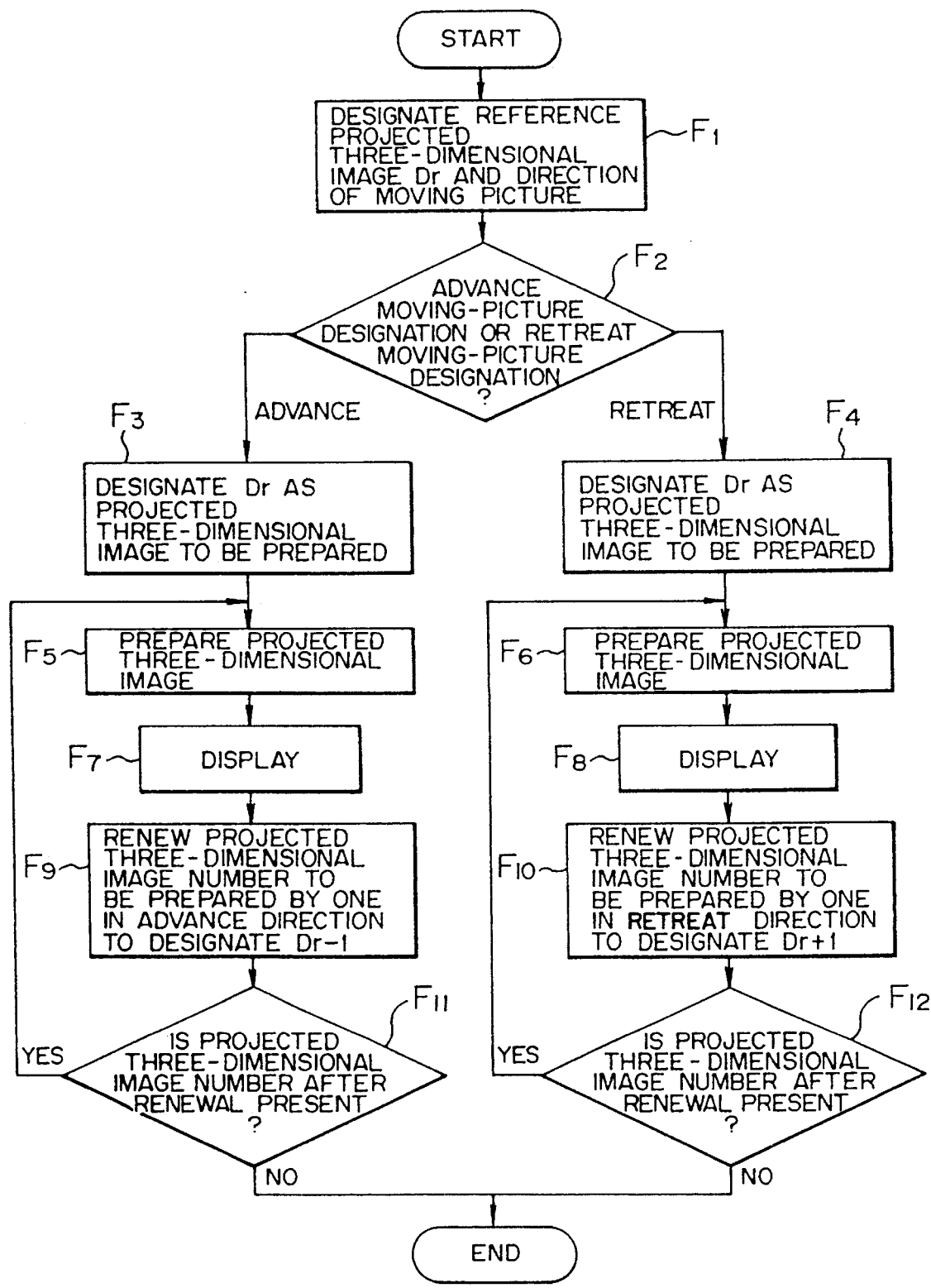
FIG. 7 is a flow chart of a processing of moving-picture display according to the invention.

FIG. 7 is a flow chart of a processing of an embodiment for preparing and displaying projected three-dimensional images on real time base when $\beta=90°$. Firstly, a reference projected three-dimensional image Dr is designated by the input unit and at the same time, the direction of a moving picture i.e., advance moving picture or retreat moving picture is designated (F1). Next, it is decided from the designated contents whether the moving-picture direction is for an advance moving picture or a retreat moving picture (F2). Regardless of either the advance moving picture or the retreat moving picture, Dr is designated as a projected three-dimensional image to be prepared (F3, F4). Further, the projected three-dimensional image Dr is prepared by stacking and projecting CT images necessary for formation of this projected three-dimensional image (F5, F6). As soon as the projected three-dimensional image Dr is prepared, it is displayed on the CRT (F7, F8). After the display, the next projected three-dimensional image to be constructed is updated by one in the advance direction, that is, Dr is changed to $D_{r-1}$ if the moving picture is advanced (F9) but in the retreat direction, it is updated in the retreat direction, that is, Dr is changed to $D_{r+1}$ if the moving picture is retreated (F10). Then, the presence or absence of a projected three-dimensional number after the update is checked and if exists, the program returns to the step F5 or F6 (F11, F12). If not existing, that is, if the number exceeds D1 and becomes Do or the number exceeds $D_{n-1}$ and becomes Dn, the processing ends because actual images Do and Dn do not exist as will be seen from FIG. 2. Needless to say, the advance moving-picture display steps F2 to F11 and the retreat moving-picture display steps F2 to F12 are processed at high speeds necessary for display of moving pictures.

According to the present embodiment, by choosing the reference projected three-dimensional image, a moving-picture display can be carried out while preparing projected three-dimensional images referenced to the reference image.

In an instance where the distance di from the viewing plane is used as a reference in place of the reference projected three-dimensional image, di substitutes for Dr in steps F3 and F4 and the distance is updated in steps F9 and F10.

Figure 8:
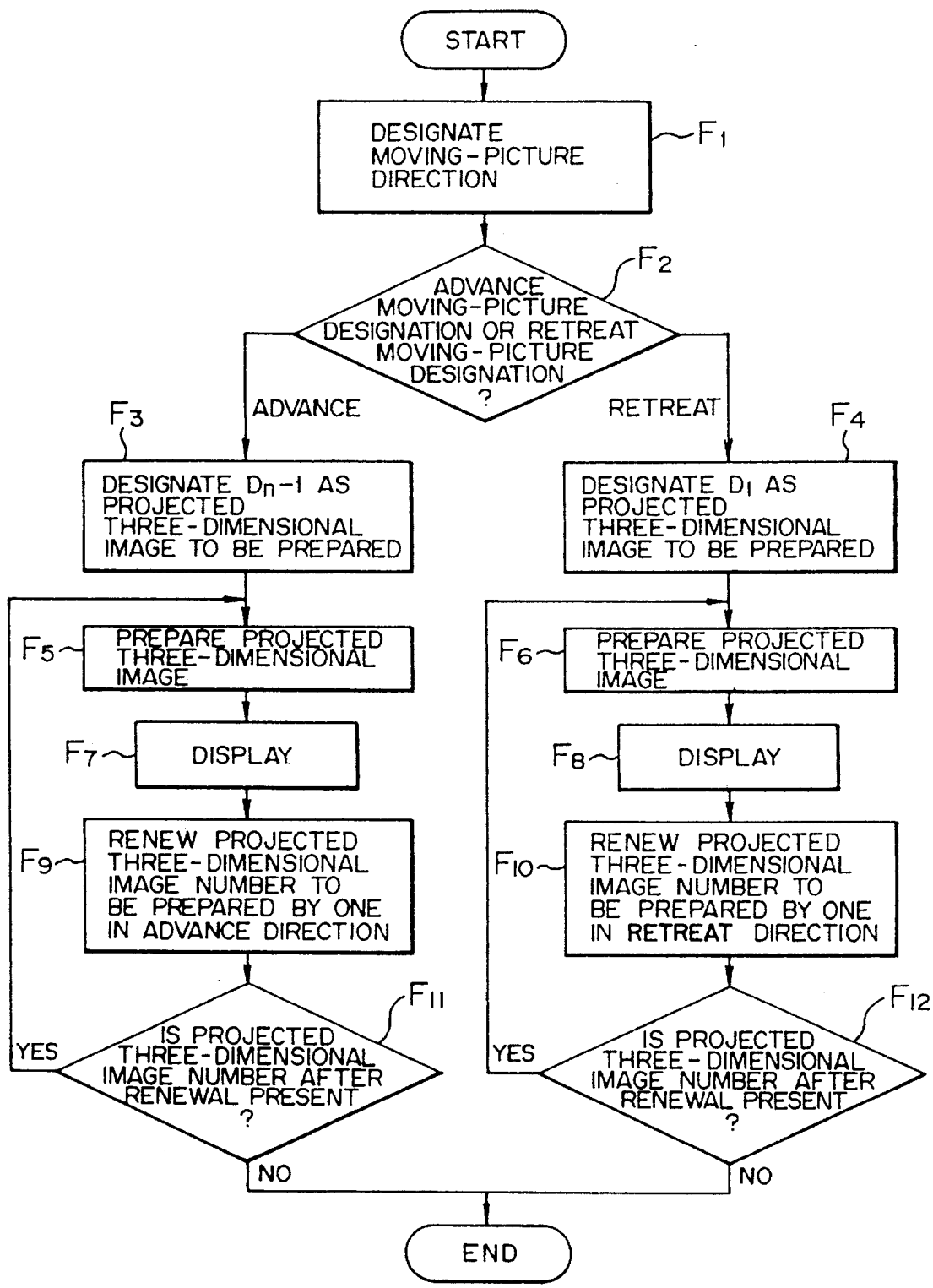
FIG. 8 is a flow chart of another processing of moving-picture display according to the invention.

The employment of the reference projected three-dimensional image is exemplified in FIG. 7 but in some applications the reference image is not set up. An embodiment of real time display corresponding to FIGS. 4A and 4B is shown in FIG. 8. This embodiment differs from the embodiment shown in FIG. 7 in the following two points i.e., in this embodiment, the designation of the reference projected three-dimensional image in step F1 is unnecessary and $D_{n-1}$ in place of Dr is designated in step F3 and D1 in place of Dr is designated in step F4. Since the operation of this embodiment is clear, it will not be necessary to be described herein. Like the FIG. 7 embodiment, this embodiment can also be realized by designating the distance di.

Embodiment 4

Figure 9:
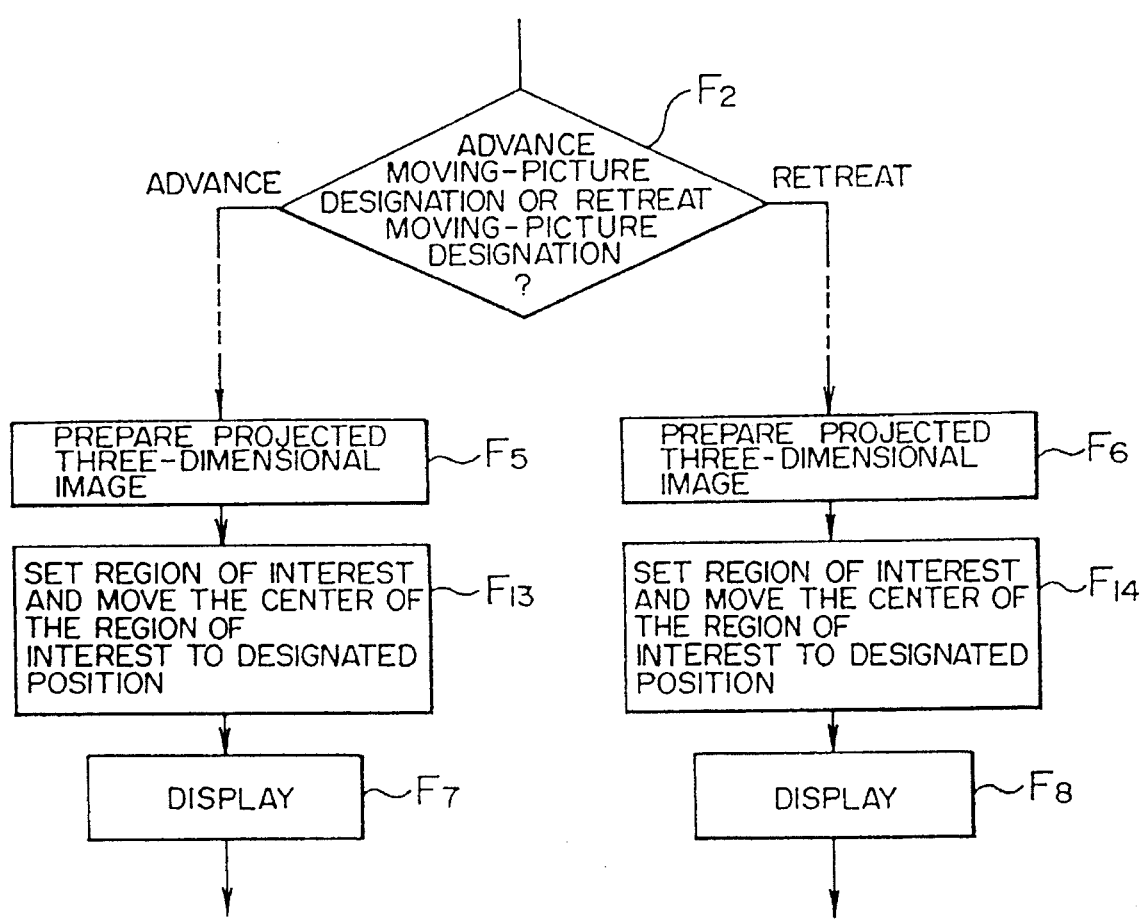
FIG. 9 is a flow chart of still another processing of moving-picture display according to the invention.

As shown in FIG. 3, the intestine 10 takes a sinuous construction on the CT image and naturally it takes also a sinuous construction on the projected three-dimensional image. By displaying the intestine in the construction of a moving picture, the intestine can be observed as seen through an endoscope. Even in the sinuous intestine, the endoscope can be moved along the inner wall of the intestine and consequently, even the sinuous intestine can be observed as seen along its inner wall. The present embodiment can afford to realize such observation in accordance with a flow chart shown in FIG. 9. FIG. 9 features insertion of additional step F13 between steps F5 and F7 of FIG. 7 or 8 and insertion of additional step F14 between steps F6 and F8 of FIG. 7 or 8. More particularly, in FIG. 9, a region of interest representing a portion to be observed by the endoscope (for example, an intestine) is set and individual images are moved as a whole in such a way that the center of the region of interest always coincides with a designated position on the display screen, for example, the center thereof. The above movement is applied to all prepared projected three-dimensional images. The center has its x coordinate value which is determined as an average value of x coordinates of pixels inside the region of interest. A y coordinate value can be determined similarly.

According to this embodiment, since the center of the region of interest is moved to a fixed position or a designated position each time that a projected three-dimensional image is prepared, cross-sections of the intestine 10, even if sinuous as shown in FIG. 3, are sequentially displayed at the designated position on the screen to construct projected three-dimensional images and the intestine can be observed as seen through the endoscope. Instead of the center, a desired point inside the region of interest may be brought to the designated position on the display screen.

Figure 10:
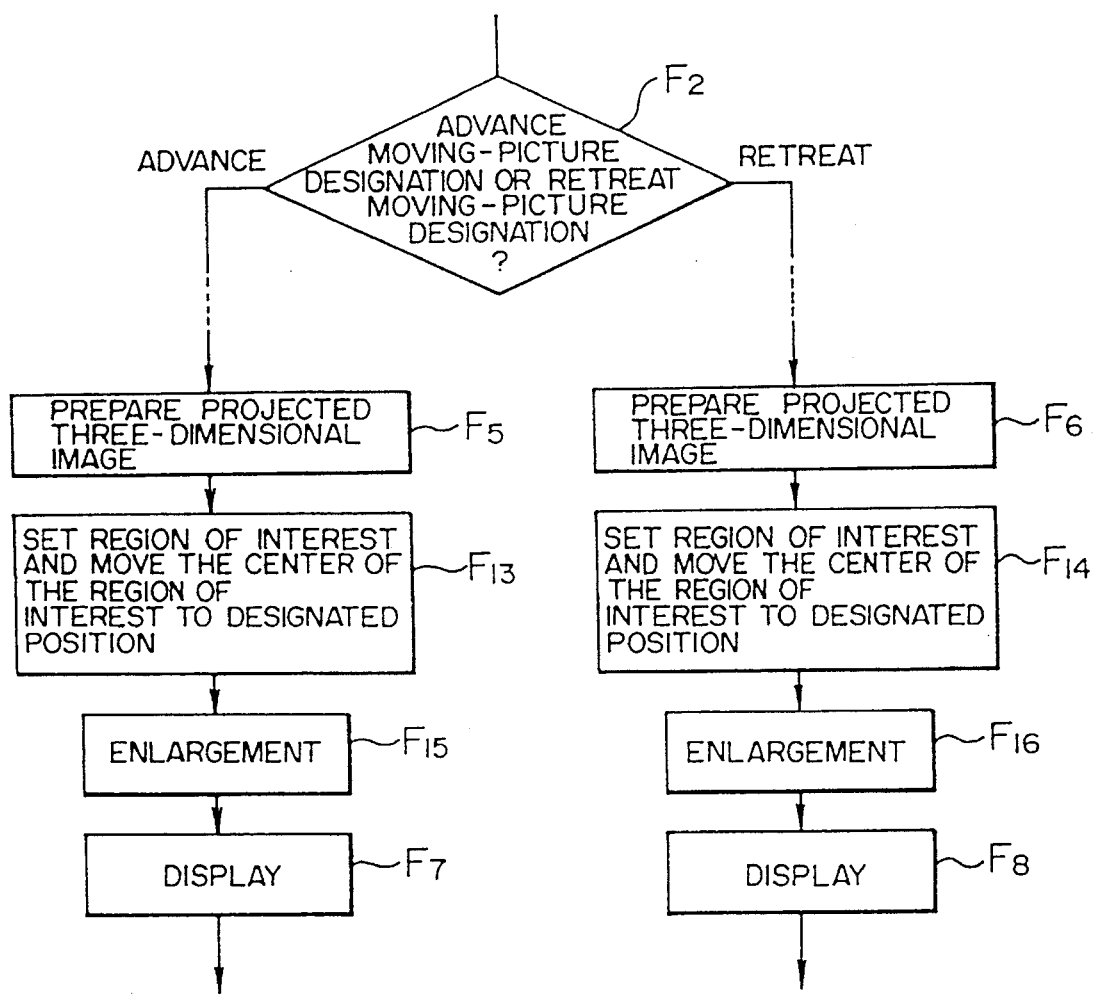
FIG. 10 is a flow chart of still another processing of moving-picture display according to the invention.

FIG. 10 features addition of enlarging processings (F15, F16) to the embodiment of FIG. 9. A region of interest having a small size is difficult to observe and therefore the figure enlargement is effected through an enlarging processing. If all projected three-dimensional images are enlarged at the same ratio, then a cross-section of a region of interest may overflow out of the display screen. In this case, the overflown portion may be neglected or the enlarging ratio may be changed midway to permit the region of interest to be displayed constantly within the screen.

The embodiments of FIGS. 9 and 10 can obviously be applied to the embodiments of FIGS. 2, 3, 4A, 4B, 5A, 5B and 6 in which three-dimensional images are stored in the memory in advance. This can be accomplished in a way in which three-dimensional images are constructed such that the coincidence of the center of the region of interest can be satisfied over all projected three-dimensional images and the thus constructed three-dimensional images are stored in a disc memory in advance or otherwise, in another way in which projected three-dimensional images are stored in the manner as described in connection with FIGS. 2, 3, 4A, 4B, 5A, 5B and 6 and they are displayed while being subjected to a calculation processing and a moving processing for coincidence of the center which are carried out on line.

Each of the foregoing embodiments has been described by way of the intestine but it may also be applied to a stomach and a breathing trachea. Further, it may be applied to portions other than the portion having a cavity. It should also be noted that each embodiment can be applied, in addition to the CT images, to such tomographic images of an object to be examined as MR images or ultrasonic images which can be stacked to construct a three-dimensional image.

Figure 11:
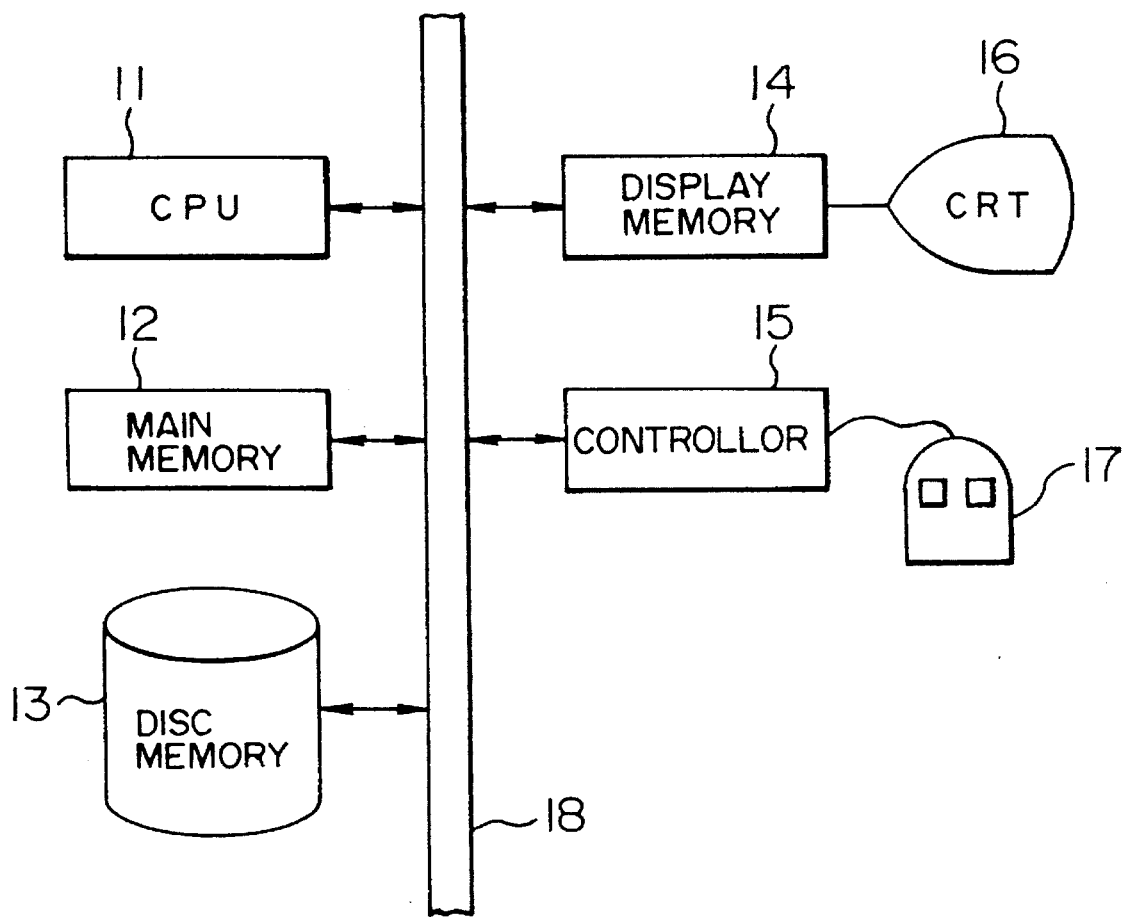
FIG. 11 is a block diagram showing a display apparatus of the present invention.

FIG. 11 is a diagram showing the construction a display apparatus for realization of the foregoing embodiments. Coupled to a common bus 18 are a CPU 11, a main memory 12, a disc memory 13, a display memory (also called an image memory) 14, and a controller 15. A CRT 16 is connected to the display memory 14 and a mouse 17 is connected to the controller 15. Projected three-dimensional images D1 to $D_{n-1}$ which are obtained as explained in connection with FIGS. 2 and 6 are stored in the disc memory 13. The CPU 11 responds to software in the main memory 12 to sequentially read out images from the disc memory 13 and display the read-out image in the construction of a moving picture on the display memory 14. The mouse 17 designates an advance moving-picture command or a retreat or reverse moving-picture command and a reference projected three-dimensional image command, and the controller 15 fetches the commands and informs the CPU 1 of the contents of the commands.

In the case of FIGS. 2, 3, 4A, 4B, 5A, 5B and 6, projected three-dimensional images are stored in the disc memory 13.

In the case of FIGS. 7 and 8, real time display is exemplified and therefore, CT images #1 to #n are stored in the disc memory 13 and a CPU capable of performing high-speed processings is used. Prepared projected three-dimensional images are saved in the disc memory 13.

We claim:

1. A method for producing a moving-picture display of three-dimensional images in a moving-picture display apparatus designed to construct projected three-dimensional images on a desirably set viewing plane from three-dimensional images constructed by stacking a plurality of planar images as a stacked region and displaying the projected three-dimensional images as a moving picture, comprising the steps of:

(a) updating the stacked region in an increasing or decreasing direction;

(b) constructing a projected three-dimensional image corresponding to said updated stacked region and storing said projected three-dimensional image in a memory;

(c) repeating said steps (a) and (b) a predetermined number of times;.

(d) sequentially reading out stored projected three-dimensional images in order of the projected three-dimensional images corresponding to the stacked regions which sequentially increase in size or the projected three-dimensional images corresponding to the stacked regions which sequentially decrease in size; and (e) displaying the projected three-dimensional images read-out as a moving picture.

2. A moving-picture display method according to claim 1, wherein said step (b) for constructing projected three-dimensional images includes, when a cutting plane parallel to said viewing plane is so set as to cross a stacked region, determining projected three-dimensional images from three-dimensional images based on stacked regions extending from said cutting plane in a direction in which said stacked regions depart from said viewing plane.

3. A moving-picture display method according to claim 1, wherein said reading out step (d) includes providing a reference of a predetermined size of stacked region and sequentially reading out projected three-dimensional images from said memory in a direction in which the stacked region increases or decreases in size beginning with the reference stacked region size.

4. A moving-picture display method according to claim 1, wherein said displaying step (e) includes:

determining the center of a region of interest in said read-out projected three-dimensional images; and performing display such that said center is brought to a designated position on a display screen.

5. A moving-picture display method according to claim 4, wherein said displaying step (e) includes performing enlarging display of said projected three-dimensional images read out.

6. A moving-picture display method according to claim 1, wherein said projected three-dimensional image constructing step (b) includes constructing said projected three-dimensional images such that coincidence of the center of a region of interest in said images is permitted, and said displaying step (e) includes performing display such that said center is brought to a designated position on a display screen.

7. A moving-picture display method according to claim 6, wherein said displaying step (e) includes enlarging said projected three-dimensional images read out.

8. A method for producing a moving-picture display of three-dimensional images in a moving-picture display apparatus designed to construct projected three-dimensional images on a desirably set viewing plane from three-dimensional images constructed by stacking a plurality of planar images as a stacked region and displaying the projected three-dimensional images as a moving picture, comprising the steps of:

(a) updating the stacked region in an increasing or decreasing direction;

(b) constructing a projected three-dimensional image on said viewing plane from a three-dimensional image based on the updated stacked region and displaying the projected three-dimensional image on a display screen; and (c) repeating said steps (a) and (b) a predetermined number of times so as to enable display as a moving picture.

9. A moving-picture display method according to claim 8, wherein said step (b) for constructing projected three-dimensional images includes, when a cutting plane parallel to said viewing plane is so set as to cross a stacked region, determining projected three-dimensional images from three-dimensional images based on stacked regions extending from said cutting plane in a direction in which said stacked regions depart from said viewing plane.

10. A moving-picture display method according to claim 8, wherein said displaying step (b) includes:

determining the center of a region of interest in said constructed projected three-dimensional images; and performing display such that said center is brought to a designated position on a display screen.

11. A moving-picture display method according to claim 10, wherein said displaying step (b) includes performing enlarging display of said constructed projected three-dimensional images.

12. An apparatus for producing a moving-picture display of three-dimensional images, comprising:

means for constructing stacked three-dimensional images by stacking a plurality of planar images as a stacked region;

memory means for increasing or decreasing the stacked region and storing stacked three-dimensional images obtained corresponding to respective stacked regions;

means for sequentially reading out said stored three-dimensional images from said memory in order of the three-dimensional images corresponding to stacked regions which sequentially increase in size or the three-dimensional images corresponding to stacked regions which sequentially decrease in size; and means for displaying said three-dimensional images read out as a moving picture.

13. An apparatus for producing a moving-picture display of three-dimensional images, comprising:

means for constructing stacked three-dimensional images by stacking a plurality of planar images or a stacked region;

means for constructing projected three-dimensional images on a desirably set viewing plane from said stacked three-dimensional images;

means for increasing or decreasing the stacked region and determining a projected three-dimensional image from a stacked three-dimensional image obtained corresponding to each stacked region;

memory means for storing a plurality of projected three-dimensional images, each projected three-dimensional image being determined for each stacked region which is updated by increasing or decreasing;

designation/input means for designating either one of advance moving-picture designation and reverse moving-picture designation;

means for sequentially reading out said projected three-dimensional images in order of stacked regions which begin with a larger stacked region when the advance motion-picture designation is inputted but in order of stacked regions which begins with a smaller stacked region when the reverse moving-picture designation is inputted; and means for displaying read-out projected three-dimensional images as a moving picture on a display screen.

14. A moving-picture display apparatus according to claim 13, wherein said reading out means includes means for providing a reference of a predetermined stacked region or of a projected three-dimensional image number which is set by the user as a reference of moving-picture display and sequentially reading out projected three-dimensional images in order of stacked regions which sequentially increase from said reference stacked region or projected three-dimensional image number when the advance moving-picture designation is inputted but in order of stacked regions which sequentially decrease from said reference stacked region or projected three-dimensional image number when the reverse moving-picture designation is inputted.

15. A moving-picture display apparatus according to claim 13, further comprising means for displaying determined projected three-dimensional images on said display screen on real time base.

* * * * *